R. M. BLAKEY.
NUT LOCK.
APPLICATION FILED JULY 17, 1908.

982,763.

Patented Jan. 24, 1911.

WITNESSES

INVENTOR,
RICHARD M. BLAKEY.

UNITED STATES PATENT OFFICE.

RICHARD M. BLAKEY, OF BOONEVILLE, MISSOURI, ASSIGNOR, BY DIRECT AND MESNE ASSIGNMENTS, OF THREE-FOURTHS TO FRANK D. ANTHONY AND ONE-FOURTH TO MICHAEL J. O'BRIEN, BOTH OF MONTREAL, CANADA.

NUT-LOCK.

982,763.

Specification of Letters Patent. Patented Jan. 24, 1911.

Application filed July 17, 1908. Serial No. 444,116.

*To all whom it may concern:*

Be it known that I, RICHARD M. BLAKEY, of the city of Booneville, in the State of Missouri, United States of America, have invented certain new and useful Improvements in Nut-Locks, and do hereby declare that the following is a full, clear, and exact description of same.

My invention relates to improvements in nut locks and the object is to provide a simple, inexpensive and efficient device adapted to hold a nut or other internally threaded member from turning with relation to the bolt or stud on which it is screwed.

A further object is to provide a nut lock which will not require any adjustment of the lock or of the nut and which will lock the nut to the bolt at any part of the nut's revolution.

Many of the nut locks at present in use are so complicated as to prohibit their general use either from excessive cost or from the amount of time and skill required to effectually place them in position. This invention overcomes the above disadvantages by providing a simple one-piece lock which may be placed in position under the nut as readily as a plain washer and which will positively lock the nut and bolt together at any part of the nut's revolution.

Figure 1:
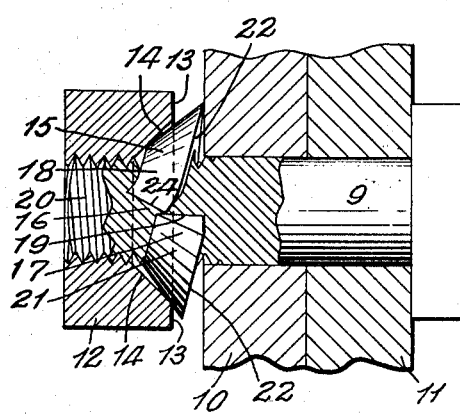
Figure 2:
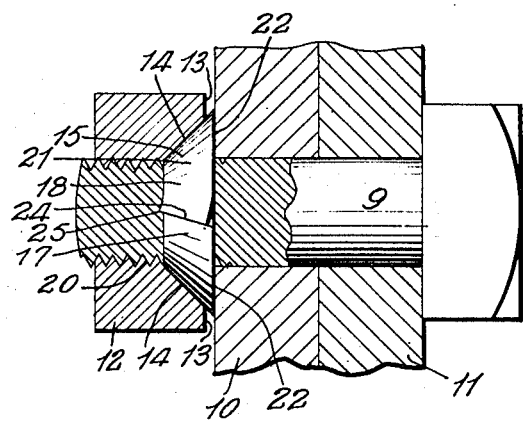
Figure 3:
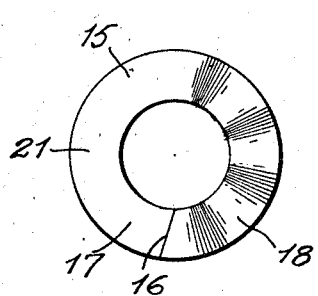
Figure 4:
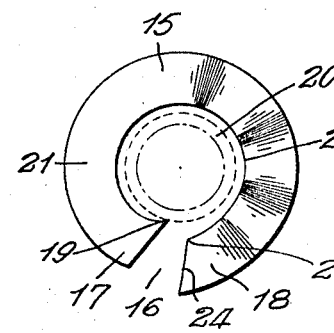
Figure 5:
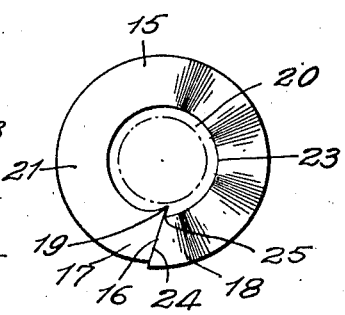
Figure 6:
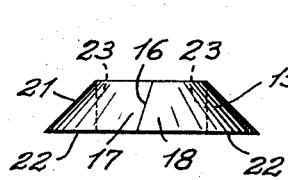
Figure 7:
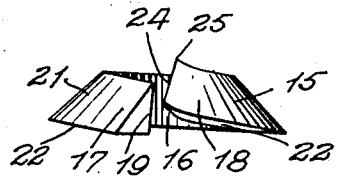
Figure 8:
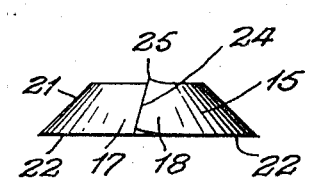

In the drawings which illustrate my invention:—Figure 1 is a partial sectional view showing the nut lock placed in position on the bolt prior to tightening the nut. Fig. 2 is a view similar to Fig. 1, and shows the nut lock after tightening the nut. Fig. 3 is a plan view of a blank used in making the nut lock. Fig. 4 is a plan view of a finished nut lock. Fig. 5 is a plan view of a nut lock as compressed by a nut. Fig. 6 is a side elevation corresponding to Fig. 3. Fig. 7 is a side elevation corresponding to Fig. 4. Fig. 8 is a side elevation corresponding to Fig. 5.

In the above defined figures, 9 designates a bolt, 10 and 11 the members united thereby and 12 a nut screwed on to said bolt. The inner face 13 of the nut 12 is slightly beveled or chamfered at 14 around its inner periphery in order that a portion of the nut lock may enter into and internally grip the nut.

The nut lock consists of a washer 15, triangular in cross section and split at 16. It is preferable that the split 16 be not radial but at a tangent to some circle drawn inside the inner periphery of the washer. The washer is expanded leaving the ends 17 and 18 separated, the former of which, 17, is turned inwardly, approximately the depth of the threads of the bolt for which the washer is adapted, and the latter of which, 18, is turned outwardly and upwardly so as to come in engagement with the chamfer 14 of the nut 12. The nut lock is slightly helical in form, as shown in the drawings, the end 17 being depressed and the end 18 raised.

When placed in position on a bolt, the nut lock assumes the position shown in Figs. 1 and 4, the edge 19 of the end 17 resting against the threads 20 of the bolt and approximately the outer half of the nut lock occupying the chamfer 14 in the nut 12. As the nut is screwed down, the chamfer 14 sliding over the beveled outer face 21 of the nut lock, forces the face 22 of the lock flat against the member 10 and at the same time compresses the lock so that the face 23 thereof grips the threads 20 of the bolt closely, the edge 19 being forced into said threads. The split 16 is thus closed and the ends 17 and 18 pressed together. The helical form of the nut lock combined with the upward and outward turn of the end 18, causes the edge 24 and particularly the corner 25 to come in very close contact with the chamfer 14. As the corner 25 of the lock is forced between the nut and the bolt, it will be obvious that any unscrewing movement of the nut will be against the edge 24 and corner 25 and will cause the same to bite into the metal of the nut. The angle at which the ring is cut renders the cutting more positive and insures the gripping efficiency of the edge 24. Thus the nut is prevented from turning, in what may be termed a reverse direction, independently of the nut lock. Any turning movement of the nut lock induced by the loosening of the nut, causes the edge 19, which is embedded in the threads 20 of the bolt, to bite deeper, the angle of the split 16 and the inward turn of the end 17 tending to lead the edge 19 deeper into the metal of the bolt. The corner 25 which is forced between the nut and the bolt acts as a wedge and aids in forcing the edge 19 into the threads of the bolt.

Assuming the device to be adapted for a right hand thread, as shown in the drawings, it is obvious that as long as the nut is turned toward the right the chamfer 14 will slip over the edge 24 of the lock, the lock being merely compressed, which compressing, by forcing the edge 19 into the threads 20, renders the bolt and nut lock practically integral so long as the compression is maintained. Any turning movement of the nut toward the left, causes the edge 24 of the nut lock to bite into the nut, whereby the nut, nut lock and bolt are locked firmly together against any revolution toward the left.

Having thus described my invention, what I claim is:—

1. In a nut lock, the combination with a bolt and a countersunk nut, of a split helical washer triangular in cross section and adapted to occupy the countersunk portion of said nut, the lower extremity of said washer being inwardly turned and provided with an inner bolt gripping edge, and the upper extremity of the washer being outwardly and upwardly turned and provided with an outer nut gripping edge, and a point adapted to be forced between the nut and the bolt, substantially as described.

2. In a nut lock, the combination with a bolt and a counter-sunk nut thereon, of a split helical washer having an inwardly turned bolt gripping edge at one extremity, an outwardly turned nut gripping edge at the other extremity and an upwardly turned bolt and nut gripping corner on said latter extremity, substantially as described.

In witness whereof I have hereunto set my hand in the presence of two witnesses.

RICHARD M. BLAKEY.

Witnesses:
W. A. McPHERSON,
R. W. WHITLOW.